US010021613B1

(12) United States Patent
Oroskar et al.

(10) Patent No.: US 10,021,613 B1
(45) Date of Patent: Jul. 10, 2018

(54) METHOD AND SYSTEM FOR CONTROLLING OPERATION OF A USER EQUIPMENT DEVICE BASED ON WHETHER THE USER EQUIPMENT DEVICE'S SERVING BASE STATION IS A RELAY BASE STATION

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 79 days.

(21) Appl. No.: 15/164,144

(22) Filed: May 25, 2016

(51) Int. Cl.
*H04W 60/04* (2009.01)
*H04W 36/14* (2009.01)
*H04W 76/02* (2009.01)
*H04L 25/20* (2006.01)
*H04W 76/10* (2018.01)

(52) U.S. Cl.
CPC ............ *H04W 36/14* (2013.01); *H04L 25/20* (2013.01); *H04W 60/04* (2013.01); *H04W 76/02* (2013.01); *H04W 76/10* (2018.02)

(58) Field of Classification Search
None
See application file for complete search history.

(56) References Cited

U.S. PATENT DOCUMENTS

| 6,295,452 B1* | 9/2001 | Choi ..................... H04W 36/12 370/331 |
| 2015/0319643 A1* | 11/2015 | Zhu ..................... H04W 72/1215 370/336 |
| 2015/0365790 A1* | 12/2015 | Edge .................. H04W 72/1263 455/404.2 |
| 2016/0073331 A1* | 3/2016 | Balakrishnan .......... H04W 4/02 455/456.1 |
| 2016/0366622 A1* | 12/2016 | Yang ................. H04W 36/0083 |

* cited by examiner

*Primary Examiner* — Olumide T Ajibade Akonai
*Assistant Examiner* — Edward Zhang

(57) ABSTRACT

Disclosed herein is a method and corresponding system for controlling how a user equipment device (UE) is served by a second network while the UE is concurrently served by a base station of a first network, where the first network has an interconnection with the second network. In an example method, if the UE determines that the base station serving the UE is not a relay base station, the UE then causes itself to be served by the second network in a first mode in which the UE is registered with the second network via the first network. Whereas, if the UE determines that the base station is a relay base station, the UE then instead causes itself to be served by the second network in a second mode in which the UE is registered with the second network directly via the second network rather than via the first network.

19 Claims, 3 Drawing Sheets

METHOD AND SYSTEM FOR CONTROLLING OPERATION OF A USER EQUIPMENT DEVICE BASED ON WHETHER THE USER EQUIPMENT DEVICE'S SERVING BASE STATION IS A RELAY BASE STATION

BACKGROUND

In wireless communication systems, wireless service providers may operate radio access networks (RANs), each RAN including a number of base stations radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

Further, a RAN may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WIFI), BLUETOOTH, and others. Each protocol may define its own procedures for registration of UEs, initiation of communications, handover between base station coverage areas, and other functions.

In accordance with the air interface protocol, each base station may provide wireless service to UEs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a UE on a single such carrier at a time or, with carrier aggregation service or the like, on multiple such carriers at a time.

Further, each base station in such a RAN may be communicatively linked with a signaling controller that carries out various network control functions, such as managing setup of bearer connections between the base station and one or more transport networks, tracking where UEs are located in the RAN, paging UEs, and the like. In addition, neighboring base stations may be communicatively linked with each other, to facilitate handover and other inter-base station signaling.

By way of example, in an LTE RAN, each base station (LTE evolved Node-B (eNodeB)) has a communication interface with a signaling controller known as a mobility management entity (MME), the base station and MME each also have a respective communication interface with a gateway system that provides connectivity with a packet-switched transport network, and the base station has a communication interface with each of its neighboring base stations. Typically, the nodes of such an LTE RAN would sit on a wireless service provider's core packet-switched network (e.g., a network compliant with the industry standard system architecture evolution (SAE) for the LTE protocol), and so the base station and each other RAN entity (e.g., MME, gateway, and neighboring base station) may each have an assigned Internet Protocol (IP) address on that network, and the interfaces between these entities may be defined as logical connections (e.g., established virtual tunnels) through that network.

In example operation, when a UE enters into coverage of an LTE base station on a particular carrier, the UE signals to the base station to initiate an attach process and to establish a radio-link-layer connection with the base station. In this process, the base station signals to the MME, the MME authenticates the UE, the MME and base station obtain and store a context/profile record for the UE, and the gateway system assigns an IP address to the UE for use by the UE to communicate on the packet-switched transport network. Further, at this point or later, the MME may engage in signaling with the base station and the gateway system to establish for the UE one or more bearers for carrying packet data between the UE and the transport network.

Once a UE is attached with a base station, the base station then serves the UE on one or more carriers, managing downlink communication of packet data to the UE and uplink communication of packet data from the UE. For example, as the gateway system receives packet data destined to the UE, the gateway system may forward the packet data to the base station, and the base station may schedule and provide transmission of that data to the UE on the UE's serving carrier(s). Likewise, as the UE has packet data to transmit on the transport network, the UE may transmit a scheduling request to the base station, the base station may schedule transmission of that data from the UE on the UE's serving carrier(s), the UE may accordingly transmit the data to the base station, and the base station may then forward the data to the gateway system for output on the transport network.

In practice, the base stations of the RAN may not always provide seamless coverage throughout an area, and therefore a wireless service provider may implement many small-cell base stations throughout the area to help fill in gaps of coverage. To connect such a base station with the network infrastructure in such a situation, the wireless service provider may implement a wireless backhaul interface (also referred to as a "wireless backhaul connection") between the base station and another base station of the service provider's RAN. In this situation, the base station at issue operates as a relay base station, and the other base station operates as a donor base station. In practice, the relay base station includes or is coupled (e.g., via a local area network or other connection) with a UE, referred to as a relay-UE, and the donor base station then serves the relay-UE in much the same way that the donor base station serves other UEs. Further, the relay base station itself serves UEs, in much the same way that any base station would.

With this arrangement, when the relay-UE attaches with the donor base station, the relay-UE may acquire connectivity and an IP address as discussed above for instance. But based on a profile record for the relay-UE, the RAN (e.g., a signaling controller) may recognize that the relay-UE is a relay-UE (rather than a conventional end-user UE) and may therefore set up a bearer connection for that relay-UE with a special core network gateway system (also referred to as a "relay gateway") that provides for internal core network connectivity and assigns the relay-UE with an IP address for use to communicate within the core network. Once the relay-UE receives that core network IP address assignment, the relay-UE may then convey that IP address to the relay base station for use by the relay base station as the relay base station's IP address on the core network. The relay base station may then operate as a full-fledged base station of the first RAN, having IP-based interfaces with other core network entities (e.g., a signaling controller, a gateway system, and other base stations), albeit with those interfaces passing via the wireless backhaul interface provided by the relay-UE and via the relay gateway.

Once the relay base station is thus in operation, the relay base station may then serve UEs in the same way as a standard base station serves UEs. Thus, when a UE enters into coverage of the relay base station, the UE may signal to the relay base station to initiate an attach process, the UE may acquire an IP address, and an MME may engage in signaling to establish one or more bearers between the UE and a gateway system. Each of these bearers, though, like the relay base station's signaling communication, would pass via the relay's wireless backhaul interface.

Overview

In the manner discussed above or in similar manners, service providers can implement relay base stations in a variety of wireless communication systems. An example of one such system is a hybrid wireless communication system that includes multiple separate but interconnected RANs, such as a first RAN (e.g., an LTE RAN) that provides high speed data communications and a second RAN (e.g., a CDMA RAN) that provides traditional telephony service, each RAN providing air interface coverage according to a different air interface protocol. In such a system, a UE may connect with and be served by the first RAN by default, to facilitate engaging in data communication, and the UE may then at some point transition to connect with and be served by the second RAN when necessary to engage in a voice call, all while at the same time continuing to be served by the first RAN. To facilitate this, a UE that registers with and is served by the first RAN may also separately register with the second RAN so that the UE can place and receive calls as necessary.

A UE may have two mutually exclusive modes of operation for doing this in practice. In the first of these two modes, after the UE registers with a base station of the first RAN, the UE may then engage in pre-registration signaling with the second RAN via the first RAN (i.e., via the base station and the first RAN's core network) in order to register for service of the second RAN, and may thereafter engage in call setup signaling with the second RAN, via the first RAN, to receive/place a voice call.

In the second of these two modes, on the other hand, the UE may register with the second RAN directly via the second RAN rather than via the first RAN, and may be set to engage in call setup signaling with the second RAN directly via the second RAN rather than via the first RAN. Thereafter, while in the second mode, the UE may then operate in the first RAN for data service, but may (i) periodically tune away from coverage of the first RAN to coverage of the second RAN in order to search for page messages from the second RAN (i.e., for a UE-terminated call), or (ii) move over to the second RAN to originate a voice call.

Typically, in such a system, the UE's operation in the first mode will involve more signaling passing between the UE's serving base station and the core network of the first RAN, whereas the UE's operation in the second mode will involve less signaling passing between the UE's serving base station and the core network of the first RAN. The reason for this is because, in the first mode, the signaling noted above that passes between the UE and the second RAN will flow over the first RAN's air interface via the UE's serving base station and the core network of the first RAN, whereas, in the second mode, the UE will instead simply engage in signaling directly with the second RAN over the second RAN's air interface. Unfortunately, the UE's signaling in the first mode can be an issue when the UE's serving base station is a relay base station. For instance, the signaling could burden (e.g., congest) the wireless backhaul interface between the relay base station and the donor base station, and the need for the signaling to flow over that wireless backhaul interface and via the relay gateway could delay the signaling and thus result in delayed call setup. Consequently, an improvement is desired.

Disclosed herein is a method and system for a UE to control its operation in a hybrid system such as the system described above, taking into account whether the UE's serving base station is a relay base station that has a wireless backhaul interface. In accordance with the disclosure, a UE served by the first RAN may be arranged to determine whether the UE's serving base station is a relay base station or is rather a non-relay base station, and to then use that determination as a basis for deciding whether to operate in the first mode or rather to operate in the second mode. For instance, if the UE determines that its serving base station is a relay base station, the UE will responsively decide to operate in the second mode, whereas if the UE determines that its serving base station is not a relay base station, the UE will responsively decide to operate in the first mode. In this manner, the UE can help reduce the signaling that may occur over the relay base station's wireless backhaul interface, thereby reducing the burden on that interface.

Accordingly, in one respect, disclosed is a method for controlling operation of a UE in a communication system in which a first RAN provides first-RAN air interface coverage according to a first air interface protocol and a second RAN provides second-RAN air interface coverage according to a second air interface protocol, and in which the first RAN has an interconnection with the second RAN. In particular, disclosed is a method for controlling how the UE is served by the second RAN while the UE is concurrently served by a base station of the first RAN. The method involves making a determination of whether the base station serving the UE is a relay base station. Further, the method involves, if the determination is that the base station serving the UE is not a relay base station, then causing the UE to be served by the second RAN in a first mode in which the UE is registered with the second RAN via the first RAN and is set to engage in call setup signaling with the second RAN via the first-RAN air interface coverage and the interconnection. And the method involves, if the determination is that the base station serving the UE is a relay base station, then instead causing the UE to be served by the second RAN in a second mode in which the UE is registered with the second RAN directly via the second RAN rather than via the first RAN and is set to engage in call setup signaling with the second RAN via the second-RAN air interface coverage rather than via the first-RAN air interface coverage and the interconnection.

In another respect, disclosed is a method for controlling operation of a UE in the communication system noted above. In particular, disclosed is a method is for controlling how the UE is served by the second RAN while the UE is concurrently served by a base station of the first RAN, where the UE has two mutually exclusive modes of operation in which the UE can be served by the second RAN while the UE is concurrently being served by the first RAN. The two modes include (i) a first mode of operation in which the UE is registered with the second RAN via the first RAN and is set to engage in call setup signaling with the second RAN via the first-RAN air interface coverage and the interconnection and (ii) a second mode of operation in which the UE is registered with the second RAN directly via the second RAN rather than via the first RAN and is set to engage in call setup signaling with the second RAN via the second-RAN air interface coverage rather than via the first-RAN air interface coverage and the interconnection.

The method may involve the UE making a determination of whether the base station serving the UE has a wireless backhaul connection with one or more other entities of the first RAN. Further, the method may involve, based on the determination of whether the base station serving the UE has a wireless backhaul connection, the UE deciding whether to operate in the first mode or instead to operate in the second mode. The method may then involve the UE operating in the decided mode.

In still another respect, disclosed is a UE comprising a first radio, a second radio, and a control unit. The first radio is configured for the UE to be served by a first RAN, where the first RAN provides first-RAN air interface coverage according to a first air interface protocol, and where the first RAN has an interconnection with a second RAN. The second radio is configured for the UE to be served by the second RAN, where the second RAN provides second-RAN air interface coverage according to a second air interface protocol. And the control unit is configured to control how the UE is served by the second RAN while the UE is concurrently served by a base station of the first RAN.

This controlling of the UE may involve: (i) making a determination of whether the base station serving the UE has a wireless backhaul interface with one or more other entities of the first RAN, (ii) if the determination is that the base station serving the UE does not have a wireless backhaul interface, then causing the UE to be served by the second RAN in a first mode in which the UE is registered with the second RAN via the first RAN and is set to engage in call setup signaling with the second RAN via the first-RAN air interface coverage and the interconnection, and (iii) if the determination is that the base station has a wireless backhaul interface, then instead causing the UE to be served by the second RAN in a second mode in which the UE is registered with the second RAN directly via the second RAN rather than via the first RAN and is set to engage in call setup signaling with the second RAN via the second-RAN air interface coverage rather than via the first-RAN air interface coverage and the interconnection.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example in the context of a hybrid LTE/CDMA communication system. However, it will be understood that the principles of the disclosure can extend to apply in other scenarios as well, such as with respect to other air interface protocols. Further, even within the context of a system that supports both LTE service and CDMA service, numerous variations form the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
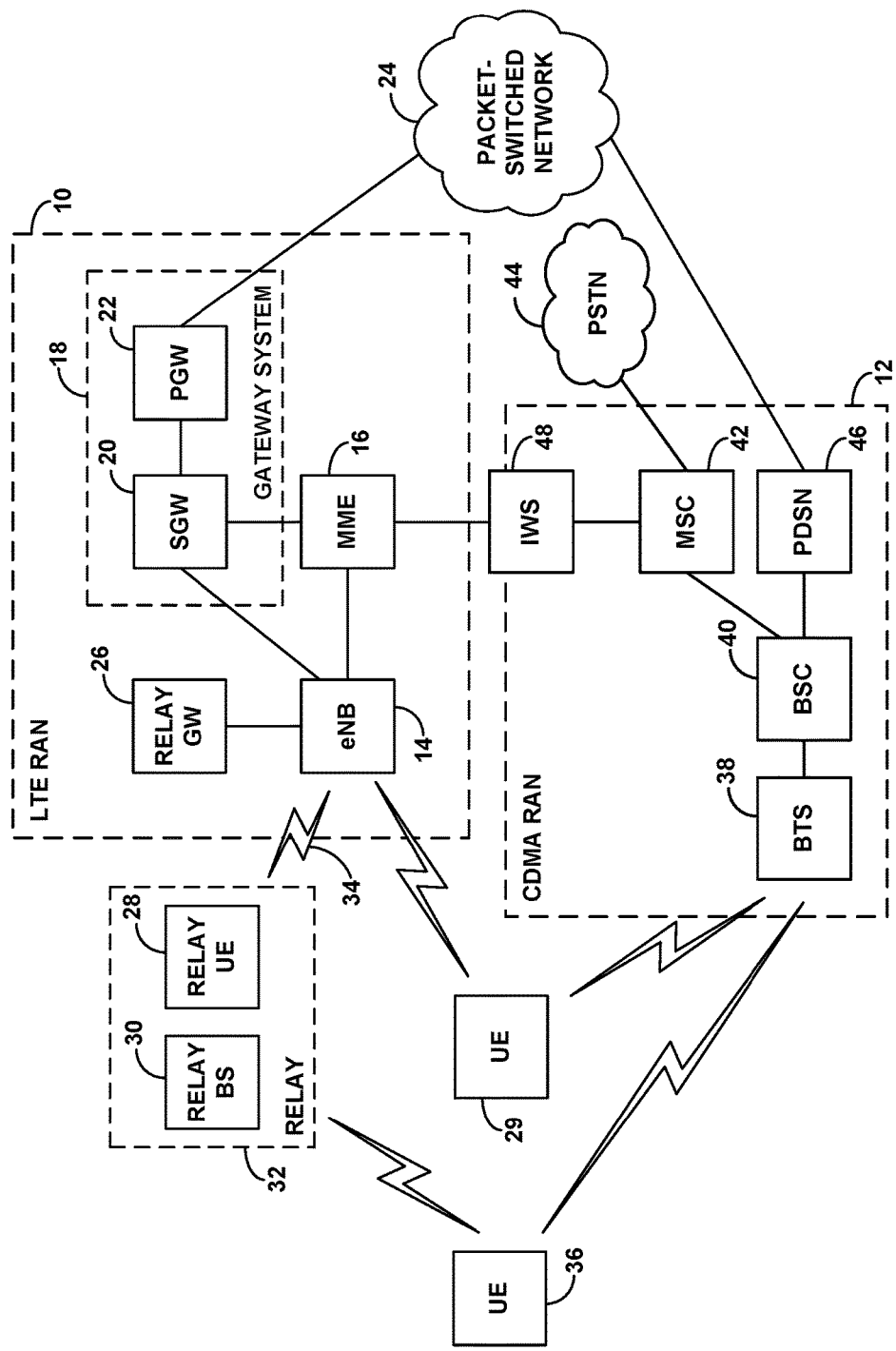
FIG. 1 is a simplified block diagram of an example wireless communication system in which aspects of the present disclosure can be implemented.

FIG. 1 is a simplified block diagram of an example wireless communication system in which the present method and system can be implemented. In particular, the example system includes an LTE RAN 10 and a CDMA RAN 12. In the example system, the LTE RAN functions primarily to serve UEs with wireless packet data communication service. Whereas the CDMA RAN primarily serves UEs with wireless circuit-switched voice call service but may also provide packet-data communication service and other types of service. The LTE RAN may be a packet-switched network, compliant with the industry standard SAE for the LTE protocol. Both of these RANs may be operated by a common wireless service provider or by different wireless service providers.

The LTE RAN 10 in the example system is shown including a representative LTE base station 14 known as an eNodeB (or "eNB"), which includes an antenna structure and associated equipment for providing LTE coverage in which to serve UEs. The eNodeB 14 then has a communication interface with an example MME 16, where the MME functions as a signaling controller for the LTE RAN 10. Further, eNodeB 14 has a communication interface with a gateway system 18, which includes a serving gateway (SGW) 20 and a packet-data-network gateway (PGW) 22, the PGW provides connectivity with a packet-switched transport network 24 such as the Internet, and the MME has a communication interface with the SGW 20 as well. As further shown, LTE RAN then also includes, and eNodeB 14 has an interface with, a relay gateway 26 (depicted as an "relay GW"), which serves to provide connectivity within the LTE RAN, for a relay-UE and relay base station as noted above for instance.

Additionally shown in FIG. 1, within coverage of eNodeB 14, are then a plurality of UEs, including a relay-UE 28 and a non-relay UE 29. The non-relay UE 29 may be a conventional UE (e.g., cell phone or the like) that is not set to provide wireless backhaul connectivity for a relay base station. Whereas, the relay-UE 28 may be a UE that is set to provide wireless backhaul connectivity for a relay base station, such as relay base station 30 as shown. As such, a relay-UE could be a conventional UE that is locally coupled with a relay base station (e.g., via a local area network or direct cable or wireless connection) and that is configured to operate as a relay-UE for relay base station 30 as discussed above, or the relay-UE could be a UE module that is incorporated within a base station, thereby allowing the base station to obtain wireless backhaul connectivity and thus function as a relay base station. FIG. 1 thus further depicts relay-UE 28 and relay base station 30 cooperatively defining a relay 32. As such, eNodeB 14 serves as a donor base station for relay 32 and as a conventional base station for any non-relay UEs (e.g., UE 29) that may also be positioned within coverage of eNodeB 14, relay 32 has a wireless backhaul connection 34 with the donor base station 14, and relay 32 then provides its own wireless coverage for serving one or more other UEs, such as representative UE 36. As noted above, the relay 32 (i.e., relay base station 30) may serve UEs such as UE 36 in the same way as eNodeB 14 serves UEs such as UE 29.

In practice, each relay-UE and conventional UE may be configured within the LTE RAN 10 as a device to be served by the network, and a mechanism may be provided to distinguish relay-UEs from conventional UEs, so as to facilitate treating relay-UEs differently than conventional UEs. By way of example, a relay-UE may have a special identifier or operate and be served by the network under a special network identifier (e.g., a special public land mobile network (PLMN) identifier, or special packet data network (PDN) connection identifier), indicating that the relay-UE will be operating as a relay-UE. Whereas a conventional UE may have an identifier or be served by the network under an identifier that does not indicate the UE will be operating as a relay-UE and thus that may establish the UE is not a relay-UE. Accordingly, when a UE attaches with the network, such as with eNodeB 14, the network (e.g., the base station, MME, and/or other network entity) may determine whether the UE is a relay-UE (i.e., whether the UE provides wireless backhaul connectivity for a relay base station) or not, based on such identification or other information provided by the UE during attachment or noted in a network profile record for the UE.

In an LTE RAN such as this, when a UE (such as relay-UE 28 or non-relay UE 29) initiates attachment with eNodeB 14, eNodeB 14 may then signal to the MME 16 to trigger establishment for the UE of a connection (e.g., interface) between eNodeB 14 and the MME. Further, this signaling also causes the MME to engage in signaling to establish some other connections for the UE, which may vary based on whether the UE is a conventional UE or rather a relay UE (e.g., as indicated by the UE's PLMN identifier or other data). For instance, if the UE is a conventional UE, then the MME may engage in signaling with eNodeB 14 and SGW 20 to establish for the UE a connection between eNodeB 14 and the SGW 20 and a connection between the SGW 20 and the PGW 22, and PGW 22 may assign to the UE an IP address for use on the packet-switched transport network 24. Whereas, if the UE is a relay-UE, then the MME may engage in signaling with eNodeB 14 and relay GW 26 to establish for the UE a connection between eNodeB 14 and the relay GW 26 and a connection internally within the relay GW 26, and the relay GW 26 may assign to the UE an IP address for use internally within the LTE RAN 10.

In line with the discussion above, once relay-UE 28 acquires connectivity with its donor base station (eNodeB 14) and receives an IP address assignment, the relay-UE 28 may then provide that IP address to its relay base station 30, so that relay base station 30 can use that IP address as its own address for communicating with other entities in the LTE RAN 10. The relay-UE 28 and relay base station 30 may each be programmed with processor logic to facilitate this. Once relay base station 30 thus has an IP address on the LTE core network, communications that relay base station 30 has in the LTE RAN 10 will pass via a tunnel through (i) the relay-UE 28, (ii) the wireless backhaul connection 34 between the relay-UE 28 and eNodeB 14, (iii) eNodeB 14, and (iv) the relay GW 26.

When a conventional UE enters into coverage of an LTE base station, such as UE 29 entering into coverage of eNodeB 14, or UE 36 entering into coverage of relay base station 30 as shown, the UE may signal to the LTE base station to initiate an attach process and to establish for the UE a radio-link-layer connection (e.g., radio resource control (RRC) connection) with the LTE base station so that the LTE base station can then provide the UE with LTE service. In particular, for UE 29, this process may involve eNodeB 14 signaling to the MME 16, the MME 16 authenticating UE 29, obtaining and storing a context/profile record for UE 29, and engaging in signaling with eNodeB 14 and the gateway system 18 to establish one or more bearers between UE 29 and the PGW 22, and the gateway system 18 assigning an IP address to UE 29 for use by the UE to communicate on the packet-switched transport network 24. This process may be similar for UE 36, with the exception that each bearer established for UE 36, like the relay base station's signaling communications, would pass via the wireless backhaul connection 34 with eNodeB 14 and via relay GW 26.

Further, in practice, a wireless service provider of the LTE RAN may assign to each base station of the LTE RAN (such as eNodeB 14, relay base station 30, and other base stations not shown in FIG. 1) a particular physical cell identifier (PCI) that is used to scramble air interface communications and to likewise distinguish communications from those in adjacent or other nearby base stations. Each PCI may have a particular value that UEs (and perhaps other entities of the LTE RAN) may be arranged to recognize as an identifier of the type of base station to which the PCI value is assigned. In particular, the wireless service provider may assign one range of PCI values to conventional LTE base stations such as eNodeB 14, and may assign another range of PCI values to relay base stations such as relay base station 30. Further, at some point during or after a UE has registered to be served by the LTE RAN, the UE's serving LTE base station may be arranged to broadcast to the UE synchronization signaling indicating the PCI of the base station, and the UE may be arranged to read the synchronization signaling to determine the PCI.

Referring back to the arrangement of FIG. 1, the CDMA RAN 12 is shown including a representative CDMA base station 38 known as a base transceiver station (BTS), which includes an antenna structure and associated equipment for providing CDMA coverage in which UEs can be served by the BTS and thus by the CDMA RAN. The BTS is then shown in communication with a base station controller (BSC) 40, which is in turn shown in communication with a mobile switching center (MSC) 42 that provides connectivity with the PSTN 44 and in communication with a packet data serving node (PDSN) 46 that provides connectivity with the packet-switched network 24. Other BTSs (not shown) may exist in this hybrid system as well, each providing CDMA coverage.

Further shown in FIG. 1 is an interworking server (IWS) 48, which provides connectivity between the LTE RAN and the CDMA RAN to facilitate exchange of signaling between the RANs, such as the pre-registration signaling and the call setup signaling discussed above. The IWS may be provided as an element of either one of the RANs or as an element separate from but connected to each RAN, and in a representative arrangement as shown has a communication interface (e.g., an S102 interface) with the MME of the LTE RAN and a communication interface with the MSC of the CDMA RAN.

In this hybrid system, each of UE 29 and UE 36 is shown to be located within coverage of both the LTE RAN and the CDMA RAN. For example, UE 36 is shown to be located within coverage of relay base station 30 and BTS 38, and UE 29 is shown to be located within coverage of eNodeB 14 and BTS 38. Further, each of UE 29 and UE 36 is a hybrid telephony device (e.g., cell phone or other such device) equipped to support both LTE service and CDMA service (e.g., having a radio and associated components for selectively engaging in LTE service or CDMA service). In practice, a UE equipped in this manner may be configured to prefer LTE service by default. Thus, when the UE is in coverage of both the LTE RAN and the CDMA RAN as shown, the UE may register to be served by an LTE base station as discussed above. For example, UE 29 may register to be served by eNodeB 14, and UE 36 may register to be served by relay base station 30.

In line with the discussion above, when the UE is served by the LTE base station, the UE may also operate in one of two mutually exclusive modes of operation, each of which allow the UE to engage in voice calls served by the CDMA RAN while being served concurrently by the LTE base station. Further, also in line with the discussion above, a first of these two modes may involve more signaling via the LTE RAN (e.g., passing between the LTE base station and the LTE core network) and a second of these two modes may involve less signaling via the LTE RAN. In the context of a hybrid LTE/CDMA system, the first mode may be referred to as "circuit-switched fallback" (CSFB) mode and the second mode may be referred to as "single-radio-LTE" (SRLTE) mode. It should be noted that, while CSFB mode and SRLTE mode are discussed herein as examples of the first mode and the second mode, other examples of the first mode and the second mode are also possible.

The UE may be arranged by default to operate in CSFB mode. In CSFB mode, which may be the UE's default mode, the UE may engage in pre-registration signaling with the CDMA RAN via the LTE base station and the LTE RAN's core network in order to register for CSFB service of the CDMA RAN. To facilitate this in practice, the UE may transmit to its serving LTE base station a CDMA pre-registration request message, and that message may pass through the LTE RAN to the CDMA RAN (via IWS 48), leading to pre-registration of the UE with the CDMA RAN.

After the UE in CSFB mode is registered with the LTE RAN and the CDMA RAN, CDMA call setup signaling can pass between the UE and the CDMA RAN via the LTE RAN (i.e., via the LTE base station and the LTE RAN's core network) and via the IWS 48. For instance, when the CDMA RAN has a call to connect to the UE, the CDMA RAN (e.g., the MSC 42) may then send to the IWS a page request, and the IWS may in turn signal to the MME 16. The MME may then signal to the UE's serving LTE base station to trigger the LTE base station to transmit a CSFB page to the UE over the RRC connection, which may cause the UE to transmit to its serving LTE base station a CSFB extended service request (ESR) message. The LTE base station may then forward the ESR message to the MME, which in turn may pass the ESR message to the CDMA RAN. Thereafter, the CDMA RAN (e.g., BTS 38, as directed by the MSC 42) may assign a CDMA traffic channel to the UE and transmit to the UE (via the LTE RAN) a traffic channel assignment message for the assigned channel, and the UE may then leave service of the LTE RAN and transition to engage in the call via the CDMA RAN on the assigned traffic channel. Likewise, when the UE has a call to originate, the UE may send an ESR message to its serving LTE base station, and similar CDMA call setup signaling via the LTE RAN may then occur.

In SRLTE mode, on the other hand, the UE may register with the CDMA RAN directly over the CDMA air interface via BTS 38 rather than via the LTE RAN. In particular, the UE may detect a pilot signal broadcast by BTS 38 and responsively transmit a registration request message to the BTS, which the BTS may then forward (perhaps via the BSC 40) to the MSC 42. The MSC may then engage in signaling with a home location register (not shown) to register the UE as being served by the MSC, so that calls to the UE can be connected to the UE via the MSC. Once the UE is registered with the CDMA RAN, the UE may then idle within coverage of the LTE RAN for data service, but may engage in call setup signaling directly over the CDMA air interface as discussed above, such as by periodically tuning away to search for page messages from the CDMA RAN (for a UE-terminated call) or by moving over to the CDMA RAN to originate a voice call.

CSFB mode will generally involve more signaling via the LTE base station and the LTE core network than SRLTE mode will involve. In particular, in CSFB mode, the UE's CSFB signaling (i.e., pre-registration and call setup signaling) with the CDMA RAN will flow over the LTE air interface via the LTE base station and the LTE core network rather than directly over the CDMA air interface. Whereas, in SRLTE mode, the UE will instead engage in signaling directly with the CDMA RAN over the CDMA air interface. As noted above, a mode that involves more signaling passing via the LTE base station could be less desirable if the LTE base station is a relay base station, such as relay base station 30. Consequently, if the LTE base station is a relay base station, it may be more desirable for the UE to operate in SRLTE mode, which involves less signaling via the LTE base station (e.g., over wireless backhaul connection 34 between relay base station 30 and donor eNodeB 14), instead of in CSFB mode, which involves more signaling via the LTE base station.

Accordingly, per the present disclosure as noted above, a UE arranged as discussed above and served by the LTE RAN will determine whether the UE's serving LTE base station is a relay base station (e.g., relay base station 30) or is rather a non-relay base station (e.g., eNodeB 14), and to then use that determination as a basis for deciding whether to operate in CSFB mode or rather to operate in SRLTE mode. For instance, if the UE determines that its serving LTE base station is a relay base station, the UE will responsively decide to operate in SRLTE mode, whereas if the UE determines that its serving LTE base station is not a relay base station, the UE will responsively decide to operate in CSFB mode. By way of example, in the arrangement shown in FIG. 1, UE 36 may determine that its serving LTE base station (relay base station 30) is a relay base station, and may responsively operate in SRLTE mode. Whereas, UE 29 may determine that its serving LTE base station (eNodeB 14) is a standard, non-relay base station, and may responsively operate in CSFB mode.

The UE may determine whether its serving LTE base station is a relay base station in various ways. In some implementations, for instance, the UE may receive from its serving base station a message including an indication of whether or not the base station is a relay base station, and the UE may then read the message to determine whether or not the base station is a relay base station. By way of example, such a message could be a unicast message from the base station to the UE, such as an RRC connection reconfiguration message for instance, or it could be a system information message generally broadcast by the base station for receipt by UEs served by the base station, such as a System Information Block #2 (SIB2) broadcast and/or a System Information Block #3 (SIB3) message.

In other implementations, the UE may at some point receive or discern from the base station a PCI identifying the base station as discussed above, and the UE may be provisioned with data or logic to determine which type of base station (e.g., a conventional, non-relay base station, or a relay base station) that the PCI identifies. For instance, the UE may be provisioned with a table that correlates respective PCI values to respective types of base stations, and may refer to the table to determine the type of base station that the received PCI identifies. In such implementations, the UE may be arranged to operate in SRLTE mode in response to at least the UE determining that the PCI identifies the base station as a relay base station, whereas the UE may otherwise be arranged to operate in CSFB mode (when the UE determines that the PCI identifies the base station as a non-relay base station).

In some implementations of the disclosed process, the UE deciding to operate in CSFB mode or rather to operate in SRLTE mode may occur in various ways. For example, the UE may be operating in one of the two modes by default, and in response to determining whether the UE's serving base station is a relay base station, the UE may either (i) decide to switch to operating in the other of the two modes (e.g., switch from CSFB mode to SRLTE mode, or vice versa) or (ii) decide to continue to operate in its default mode. As another example, the UE may be operating in neither of the two modes by default, but in response to determining whether the UE's serving base station is a relay base station, the UE may then decide to operate in one of the two modes.

Moreover, although the disclosed process is described as performed by the UE, other entities of the LTE RAN may be arranged to perform some or all aspects of the disclosed process in some implementations. For instance, rather than the UE determining whether its serving base station is a relay base station and then responsively deciding whether to operate in CSFB mode or SRLTE mode, the UE's serving base station may transmit to the UE a message (e.g., an RRC connection reconfiguration message, SIB2 message, or SIB3 message) including data interpretable by the UE to cause the UE to operate in CSFB mode or rather to operate in SRLTE mode. By way of example, if the UE's serving base station is a relay base station, it may transmit to the UE a message including data interpretable by the UE to cause the UE to operate in SRLTE mode, whereas if the UE's serving base station is not a relay base station, it may transmit to the UE a message including data interpretable by the UE to cause the UE to operate in CSFB mode.

Figure 2:
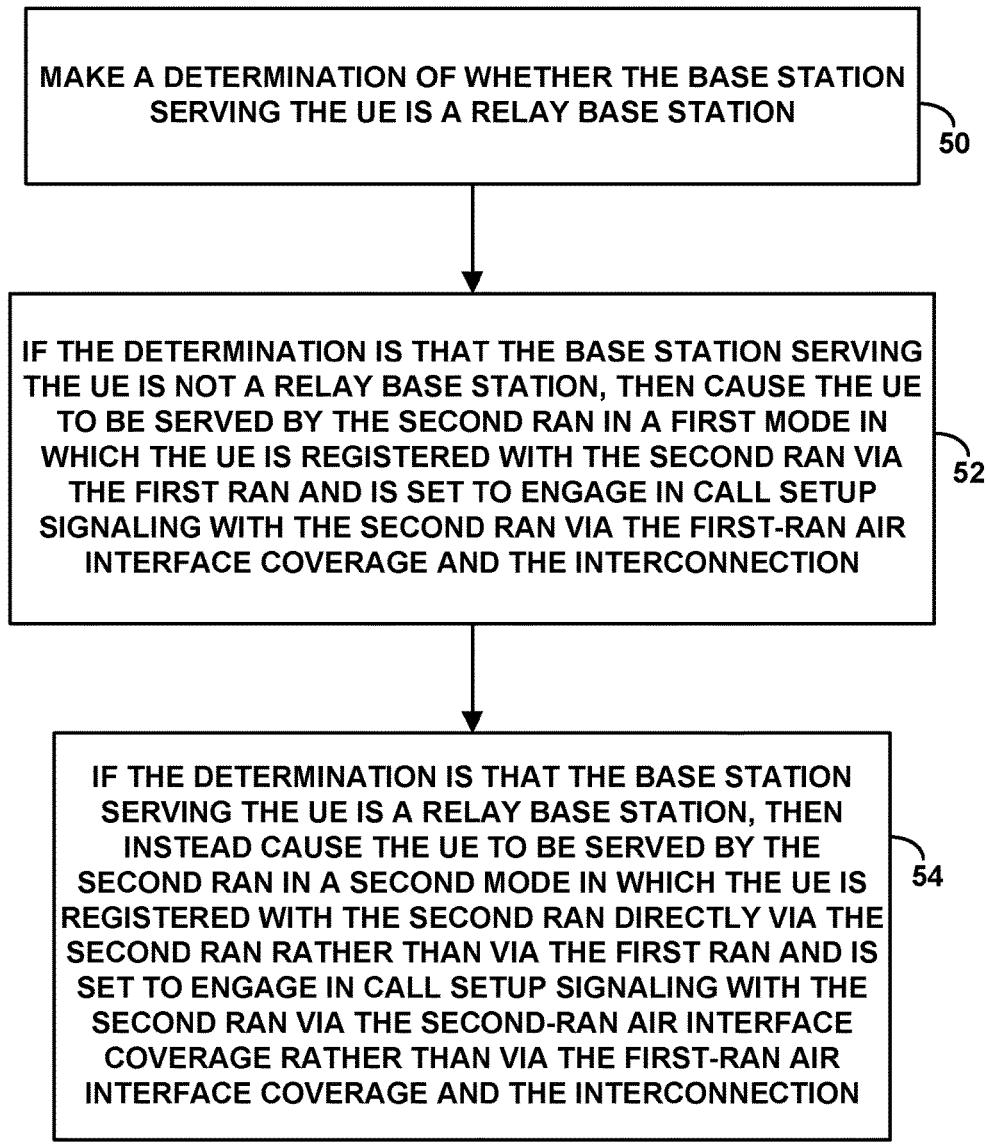
FIG. 2 is a flow chart depicting example operations that can be carried out in accordance with the present disclosure.

FIG. 2 is next a flow chart depicting operations of a UE such as UE 29 or UE 36 in line with the discussion above. The UE would operate in a wireless communication system comprising a first RAN and a second RAN, where the first RAN would provide first-RAN air interface coverage according to a first air interface protocol (e.g., LTE). The first RAN would also have an interconnection with a second RAN that is configured to provide second-RAN air interface coverage according to a second air interface protocol (e.g., CDMA).

As shown in FIG. 2, at block 50, the UE makes a determination of whether the base station serving the UE is a relay base station. Further, at block 52, if the determination is that the base station serving the UE is not a relay base station, then the UE causes itself to be served by the second RAN in a first mode in which the UE is registered with the second RAN via the first RAN and is set to engage in call setup signaling with the second RAN via the first-RAN air interface coverage and the interconnection. Still further, at block 54, if the determination is that the base station serving the UE is a relay base station, then the UE instead causes itself to be served by the second RAN in a second mode in which the UE is registered with the second RAN directly via the second RAN rather than via the first RAN and is set to engage in call setup signaling with the second RAN via the second-RAN air interface coverage rather than via the first-RAN air interface coverage and the interconnection.

Various other features described above could be incorporated into this method as well. For instance, while the UE is idling in the first-RAN air interface coverage and operating in the first mode, the UE may not tune away from the first-RAN air interface coverage to the second-RAN air interface coverage to check for pages from the second RAN, whereas, while the UE is idling in the first-RAN air interface coverage and operating in the second mode, the UE may tune away periodically from the first-RAN air interface coverage to the second-RAN air interface coverage to check for pages from the second RAN.

Figure 3:
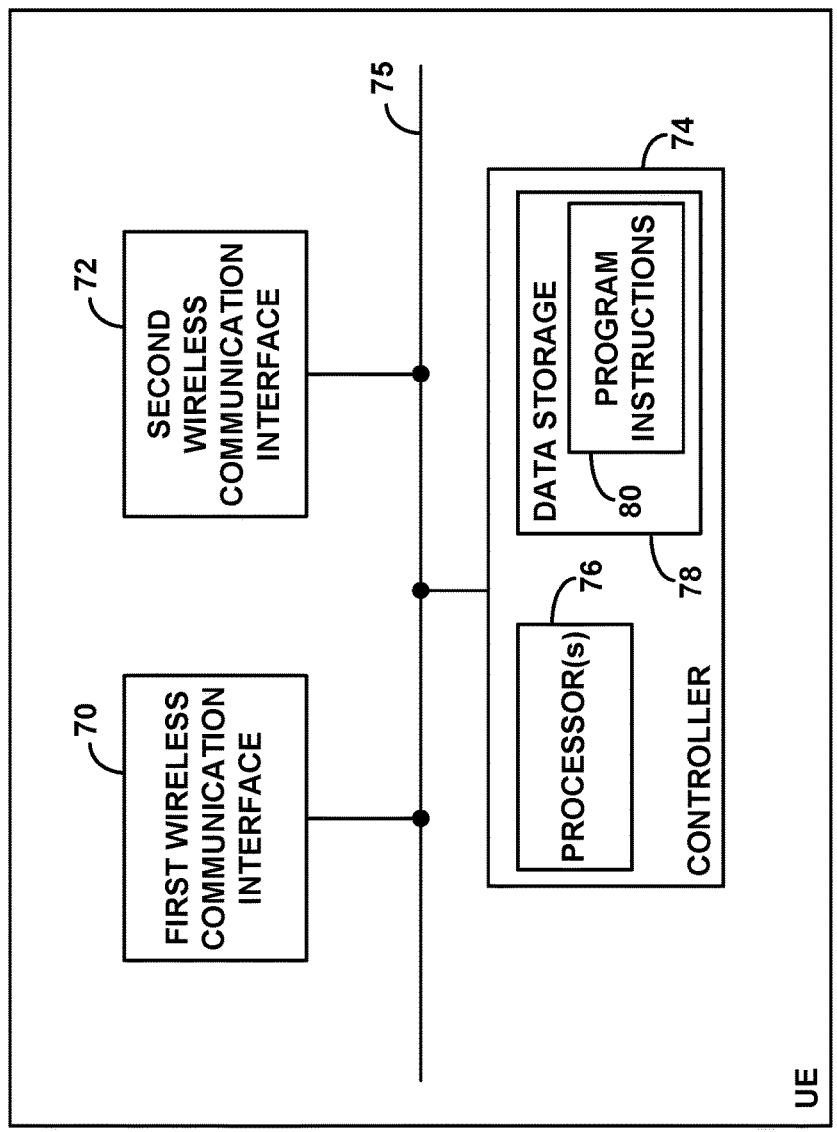
FIG. 3 is a simplified block diagram of an example UE operable in accordance with the present disclosure.

Finally, FIG. 3 is a simplified block diagram of a representative UE such as UE 29 or UE 36, showing some of the components that may be included in such a device. As shown in FIG. 3, the representative UE includes a first wireless communication interface (e.g., radio) 70, a second wireless communication interface (e.g., radio) 72, and a controller 74, all of which may be communicatively linked together by a system bus, network or other connection mechanism 75.

The first wireless communication interface 70 may be configured for the UE to be served by a first RAN according to a first air interface protocol, such as LTE or another air interface protocol discussed above. Similarly, the second wireless communication interface 72 may be configured for the UE to be served by a second RAN according to a second air interface protocol, such as CDMA, GSM, or another air interface protocol discussed above. In practice, these two wireless communication interfaces could be provided in the communication device as separate chipsets or other components, or could be integrated together on a single chipset or the like, and may include separate or integrated antennas.

The controller 74 may be configured to cause the UE to carry out various operations described herein, such as the operations discussed with respect to FIG. 2. The controller 74 may take various forms, including various combinations of hardware, firmware, and software for instance. By way of example, the controller could comprise at least one processor 76, such as one or more general purpose processors (e.g., microprocessors) and/or one or more special purpose processors (e.g., application specific integrated circuits). The controller could also comprise one or more non-transitory data storage elements (e.g., magnetic, optical, and/or flash storage), such as data storage 78. The data storage could then hold program instructions 80 executable by the processor(s) 78 to carry out various operations described herein. In addition, the program instructions 80 may include instructions that allow the UE to engage in CSFB.

Exemplary embodiments have been described above. Those skilled in the art will understand, however, that changes and modifications may be made to these embodiments without departing from the true scope and spirit of the invention.

What is claimed is:

1. In a communication system in which a first radio access network (RAN) provides first-RAN air interface coverage according to a first air interface protocol and a second RAN provides second-RAN air interface coverage according to a second air interface protocol, and in which the first RAN has an interconnection with the second RAN, a method for controlling how a user equipment device (UE) is served by the second RAN while the UE is concurrently served by a base station of the first RAN, the method comprising:

making a determination of whether the base station serving the UE is a relay base station;

if the determination is that the base station serving the UE is not a relay base station, then causing the UE to be served by the second RAN in a first mode in which the UE is registered with the second RAN via the first RAN and is set to engage in call setup signaling with the second RAN via the first-RAN air interface coverage and the interconnection; and if the determination is that the base station serving the UE is a relay base station, then instead causing the UE to be served by the second RAN in a second mode in which the UE is registered with the second RAN directly via the second RAN rather than via the first RAN and is set to engage in call setup signaling with the second RAN via the second-RAN air interface coverage rather than via the first-RAN air interface coverage and the interconnection.

2. The method of claim 1, carried out by the UE.

3. The method of claim 1, wherein making the determination of whether the base station serving the UE is a relay base station comprises:

receiving from the base station a message indicating whether the base station is a relay base station; and reading the message to make the determination of whether the base station is a relay base station.

4. The method of claim 3, wherein the message is selected from the group consisting of a System Information Block #2 (SIB2) message and a System Information Block #3 (SIB3) message.

5. The method of claim 1, wherein making the determination of whether the base station serving the UE is a relay base station comprises making a determination of whether the base station has a wireless backhaul connection with one or more other entities of the first RAN.

6. The method of claim 1, wherein the UE is set to operate in the first mode by default, wherein causing the UE to be served by the second RAN in the second mode comprises causing the UE to switch from operating in the first mode to instead operating in the second mode.

7. The method of claim 1, wherein, in the first mode, while the UE is idling in the first-RAN air interface coverage, the UE does not tune away from the first-RAN air interface coverage to the second-RAN air interface coverage to check for pages from the second RAN, and wherein, in the second mode, while the UE is idling in the first-RAN air interface coverage, the UE tunes away periodically from the first-RAN air interface coverage to the second-RAN air interface coverage to check for pages from the second RAN.

8. The method of claim 1, wherein the first mode is a circuit-switched fallback (CSFB) mode, and wherein the second mode is a Single Radio Long Term Evolution (SRLTE) mode.

9. In a communication system comprising a first radio access network (RAN) and a second RAN, a method for controlling how a user equipment device (UE) is served by the second RAN while the UE is concurrently served by a base station of the first RAN, wherein the first RAN is configured to provide first-RAN air interface coverage according to a first air interface protocol, wherein the second RAN provides second-RAN air interface coverage according to a second air interface protocol, wherein the first RAN has an interconnection with the second RAN, wherein the UE has two mutually exclusive modes of operation in which the UE can be served by the second RAN while the UE is concurrently being served by the first RAN, including (i) a first mode of operation in which the UE is registered with the second RAN via the first RAN and is set to engage in call setup signaling with the second RAN via the first-RAN air interface coverage and the interconnection and (ii) a second mode of operation in which the UE is registered with the second RAN directly via the second RAN rather than via the first RAN and is set to engage in call setup signaling with the second RAN via the second-RAN air interface coverage rather than via the first-RAN air interface coverage and the interconnection, the method comprising:

the UE making a determination of whether the base station serving the UE is a relay base station;

based on the determination of whether the base station serving the UE is a relay base station, the UE deciding whether to operate in the first mode or instead to operate in the second mode, wherein if the determination is that the base station serving the UE is not a relay base station, then the UE decides to operate in the first mode, and wherein if the determination is that the base station serving the UE is a relay base station, then the UE decides to operate in the second mode; and the UE operating in the decided mode.

10. The method of claim 9, further comprising:

before determining whether the base station serving the UE is a relay base station, the UE operating in the first mode, wherein deciding to operate in the second mode comprises deciding to switch from operating in the first mode to instead operating in the second mode, and wherein operating in the decided mode comprises switching from operating in the first mode to instead operating in the second mode.

11. The method of claim 9, wherein making the determination of whether the base station serving the UE is a relay base station comprises:

receiving from the base station a message indicating whether the base station serving the UE has a wireless backhaul connection; and reading the message to make the determination of whether the base station serving the UE is a relay base station.

12. The method of claim 11, wherein the message is selected from the group consisting of a System Information Block #2 (SIB2) message and a System Information Block #3 (SIB3) message.

13. The method of claim 9,
wherein, in the first mode, while the UE is idling in the first-RAN air interface coverage, the UE does not tune away from the first-RAN air interface coverage to the second-RAN air interface coverage to check for pages from the second RAN, and
wherein, in the second mode, while the UE is idling in the first-RAN air interface coverage, the UE tunes away periodically from the first-RAN air interface coverage to the second-RAN air interface coverage to check for pages from the second RAN.

14. The method of claim 9,
wherein the first mode is a circuit-switched fallback (CSFB) mode, and
wherein the second mode is a Single Radio Long Term Evolution (SRLTE) mode.

15. A user equipment device (UE) comprising:
a first radio configured for the UE to be served by a first radio access network (RAN), wherein the first RAN provides first-RAN air interface coverage according to a first air interface protocol, and wherein the first RAN has an interconnection with a second RAN;
a second radio configured for the UE to be served by the second RAN, wherein the second RAN provides second-RAN air interface coverage according to a second air interface protocol; and
a control unit configured to control how the UE is served by the second RAN while the UE is concurrently served by a base station of the first RAN, wherein the controlling comprises: (i) making a determination of whether the base station serving the UE is a relay base station, (ii) if the determination is that the base station serving the UE is not a relay base station, then causing the UE to be served by the second RAN in a first mode in which the UE is registered with the second RAN via the first RAN and is set to engage in call setup signaling with the second RAN via the first-RAN air interface coverage and the interconnection, and (iii) if the determination is that the base station is a relay base station, then instead causing the UE to be served by the second RAN in a second mode in which the UE is registered with the second RAN directly via the second RAN rather than via the first RAN and is set to engage in call setup signaling with the second RAN via the second-RAN air interface coverage rather than via the first-RAN air interface coverage and the interconnection.

16. The UE of claim 15, wherein making the determination of whether the base station serving the UE is a relay base station comprises:
receiving from the base station a message indicating whether the base station serving the UE has a wireless backhaul connection; and
reading the message to make the determination of whether the base station serving the UE is a relay base station,
wherein the message is selected from the group consisting of a System Information Block #2 (SIB2) message and a System Information Block #3 (SIB3) message.

17. The UE of claim 15, further comprising data storage including data that correlates respective physical cell identifiers (PCIs) to respective types of base stations, wherein making the determination of whether the base station serving the UE is a relay base station comprises:
receiving from the base station a PCI of the base station, wherein the PCI indicates whether the base station is a type of base station that has a wireless backhaul connection; and
referring to the data to determine whether the PCI correlates to a type of base station that has a wireless backhaul connection.

18. The UE of claim 15,
wherein, in the first mode, while the UE is idling in the first-RAN air interface coverage, the UE does not tune away from the first-RAN air interface coverage to the second-RAN air interface coverage to check for pages from the second RAN, and
wherein, in the second mode, while the UE is idling in the first-RAN air interface coverage, the UE tunes away periodically from the first-RAN air interface coverage to the second-RAN air interface coverage to check for pages from the second RAN.

19. The UE of claim 15,
wherein the first mode is a circuit-switched fallback (CSFB) mode, and
wherein the second mode is a Single Radio Long Term Evolution (SRLTE) mode.

* * * * *